US007451212B2

United States Patent
Friedman

(10) Patent No.: US 7,451,212 B2
(45) Date of Patent: Nov. 11, 2008

(54) LOGICAL PORT CONFIGURATION SYSTEM

(75) Inventor: Lee Friedman, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 910 days.

(21) Appl. No.: 10/803,000

(22) Filed: Mar. 17, 2004

(65) Prior Publication Data

US 2005/0210126 A1 Sep. 22, 2005

(51) Int. Cl.
*G06F 15/173* (2006.01)
*G06F 15/16* (2006.01)

(52) U.S. Cl. .................. 709/224; 709/206; 709/223

(58) Field of Classification Search .............. 709/20, 709/206, 223, 224
See application file for complete search history.

(56) References Cited

U.S. PATENT DOCUMENTS

| | | | | |
|---|---|---|---|---|
| 6,229,538 B1 * | 5/2001 | McIntyre et al. | ............ | 715/734 |
| 6,269,401 B1 * | 7/2001 | Fletcher et al. | ............ | 709/224 |
| 6,330,560 B1 * | 12/2001 | Harrison et al. | ............ | 707/8 |
| 6,363,477 B1 * | 3/2002 | Fletcher et al. | ............ | 713/151 |
| 6,381,218 B1 * | 4/2002 | McIntyre et al. | ............ | 370/245 |
| 6,839,747 B1 * | 1/2005 | Blumenau et al. | ............ | 709/223 |
| 6,917,610 B1 * | 7/2005 | Kung et al. | ............ | 370/352 |
| 7,020,796 B1 * | 3/2006 | Ennis et al. | ............ | 714/4 |
| 7,093,011 B2 * | 8/2006 | Hirata et al. | ............ | 709/223 |
| 7,257,080 B2 * | 8/2007 | Martin | ............ | 370/230 |

* cited by examiner

*Primary Examiner*—Ario Etienne
*Assistant Examiner*—Hussein Elchanti
(74) *Attorney, Agent, or Firm*—Thomas, Kayden, Horstemeyer & Risley, LLP.

(57) ABSTRACT

Systems and methods for configuring a logical port, which in one embodiment among many, can be broadly summarized by a representative method of transmitting on a first logical port, a message requesting a test of a second logical port; receiving an acknowledgement message on the first logical port; and then compiling a configuration result based on receipt of a test message through the second logical port and/or a timeout period during which the test message is not received through the second logical port. Another embodiment can be described as a configuration program stored on a computer-readable medium, the program being used to perform a communication test between a first client computing element and a server computing element to discover the status of a port of the first client computing element, where the port is used in an application program that provides communication between the first client computing element and a second client computing element.

20 Claims, 14 Drawing Sheets

Logical port configuration wizard

Port status report

| Application | Port(s) | Protocol | Status |
|---|---|---|---|
| H.323 | 1720 | TCP | Pass |
| T.120 | 1503 | TCP | Fail |

Click Next when ready

< Back  > Next  Done

FIG. 13

LOGICAL PORT CONFIGURATION SYSTEM

TECHNICAL FIELD

The present disclosure is generally related to computer systems and, more particularly, is related to systems and methods for configuring logical ports.

BACKGROUND OF THE DISCLOSURE

With reference to computers, an average user typically associates the term "port" with a physical port such as a printer port, a keyboard port, or a mouse port.

However, there exists another type of port—a "logical port" that is used by a computer to communicate with one or more other computers. Networking protocols such as the transport control protocol (TCP) and user datagram protocol (UDP) use such logical ports for Internet protocol (IP) communications. Logical port 80 for example, is the default, well-known port for hyper-text transport protocol (HTTP) communications related to the World-Wide Web (WWW). Other examples include the file transfer protocol (FTP) that uses port 21, simple mail transfer protocol (SMTP) that uses port 25, and telnet that uses port 23.

A computer that operates as a server device makes its services available to the Internet using these logical ports, one port for each service application that is available on the device. For example, if the server device is running a Web service and an FTP service, the Web server would typically be available on port 80 while the FTP server would be available on port 21.

A second computer that is a client device can access these services provided by the server, by using a "socket." A socket comprises an IP address followed by a logical port number. Once a connection has been made to one or more logical ports, the client has access to the services provided by these ports subject to using the correct protocol. The protocol used is usually determined by the need to have reliable or unreliable communications. Transmission Control Protocol (TCP) is a reliable protocol designed for transmitting digital data through a packet switching network. It can stop and correct itself when data is lost. This protocol is used to guarantee sequenced, error-free transmission, but its very nature can cause delays and reduced throughput. This can be annoying, especially with audio. User Datagram Protocol (UDP) within the IP stack, is by contrast, an unreliable protocol in which data is lost in preference to maintaining the flow.

Multiplexing, which is a feature of the TCP/IP protocol stack, allows a computer to maintain several concurrent connections with a remote computer (or computers) using different TCP or UDP ports. FIG. 1 can be used to illustrate one such connection between two client devices personal computer (PC) 105 and PC 145. When PC 105 transmits an IP data packet intended to be received by PC 145, the IP data packet is initially routed to server 125 that may be located at an Internet service provider's facility to provide Internet services to PC 105. A second server (not shown) performs a similar function for PC 145 that is at a remote location with respect to PC 105. The data packet is routed along the dotted line path 101 of FIG. 1, to reach its destination device—PC 145.

The IP data packet that is transmitted from PC 105 contains a header having the following information:

Source Address The source address is the IP address of the originating computer PC 105, which may be, for example, 201.3.83.132.

Source Port The source port is the TCP or UDP port number assigned by originating PC 105 for this data packet, for example, port 1080 of PC 105.

Destination Address The destination address is the IP address of the receiving computer PC 145, which may be, for example, 145.51.18.323.

Destination Port The destination port is the TCP or UDP port number that the originating PC 105 is requesting the receiving PC 145 to open, which may be, for example, port 3021.

The addresses specify the two computers at each end, while the port numbers ensure that the connection between the two computers uses specific network ports. The combination of these four numbers defines a single TCP/IP connection. Each port number uses 16 bits, which therefore corresponds to a theoretical maximum of 65,536 ($2^{16}$) values.

Firewalls 110 and 140 that are associated with PCs 105 and 145 respectively, are used to authenticate connections for each of these two PCs, while preventing unauthorized access by hostile users. This is accomplished by configuring the firewalls to have only a limited number of ports open for universal access, while other ports are configured to be blocked or unblocked based upon the requirements of specific applications as well as various levels of security desired. Consequently, while it may be desirable, in an ideal situation, to have all ports (TCP, UDP, FTP etc.) unblocked at all times, it is unrealistic to do so because of security concerns.

If a user of PC 105 desires to operate an application program, such as Microsoft® NetMeeting™ program to communicate with a user of PC 145, the communication in a sense, is carried out via the dotted line path 101 of FIG. 1. Several IP ports are required for establishing this Microsoft NetMeeting™ connection. Consequently, firewalls 110 and 140 have to be configured to allow communication through the following ports:

| Port | Function |
| --- | --- |
| 389 | Internet Locator Service (TCP) |
| 522 | User Location Service (TCP) |
| 1503 | T.120 (TCP) |
| 1720 | H.323 call setup (TCP) |
| 1731 | Audio call control (TCP) |
| Dynamic | H.323 call control (TCP) |
| Dynamic | H.323 streaming (RTP over UDP) |

Furthermore, to establish outbound Microsoft NetMeeting™ connections through a firewall, the firewall is also configured to:

Pass though primary TCP connections on ports 389, 522, 1503, 1720, and 1731.

Pass through secondary TCP and UDP connections on dynamically assigned ports (1024-65535).

While the Microsoft NetMeeting™ example above, is one example of a communication between two PCs, other applications such as CU-SeeMe™ and BellSouth™ Instant Messaging each have their own unique requirements for port access, configuration, and operation. Naturally, this raises several issues related to configuring firewalls to provide security while simultaneously accommodating a range of applications to be operated upon, on an individual basis by a wide variety of users on a wide variety of machines.

The first issue in configuring a firewall relates to the technical skills required of an end-user. Such skills are required to carry out tasks such as obtaining operating information and other technical details about his firewall, obtaining logical port configuration information for each desired application, and ensuring that the firewall has been suitably configured for providing appropriate access to one or more ports for one or more applications residing on his PC without unnecessarily compromising security. It can be appreciated that this type of requirement places an undue burden on an average user.

The second issue relates to the inadequacy of existing tools in providing information to a end-user for carrying out the necessary port configuration. Typically, a user of PC 105 for example, on attempting to run an application such as Microsoft NetMeeting,™ might discover that he is unable to set up a working link with the desired remote computer (for example, PC 145). When this happens, an existing troubleshooting tool may inform him that there is a configuration error. Such a message fails to pinpoint the cause of the failure. While one cause of failure can be a faulty port configuration set-up, either at his end or at PC 145, a second cause of failure may be a faulty device between PC 105 and PC 145. Such devices include server 125 and several other network elements of Internet 130 that are associated with path 101.

Even if the tool informs the user that the failure is due to a faulty port configuration, it may yet fail to reveal if the port configuration fault is at his end or if it is at the remote end. For example, the user of PC 105 may erroneously assume that his firewall 110 is at fault, when in reality it is firewall 140 that has been improperly configured.

Furthermore, while tools such as port-scanning software, may be utilized to test various ports for vulnerabilities to illegal attacks through the firewall, typically, these tools are geared towards providing computer security, and consequently fail to provide information that will assist a user in correctly configuring a set of ports that are uniquely used by a particular application, such as Microsoft NetMeeting™.

It can therefore be understood that a need exists to provide a solution that can be used to configure logical ports for operating one or more applications resident on one or more PCs of a network.

SUMMARY OF THE DISCLOSURE

One embodiment among others, of the present disclosure includes a method of transmitting on a first logical port, a message requesting a test of a second logical port; receiving an acknowledgement message on the first logical port; and then compiling a configuration result based on receipt of a test message through the second logical port and/or a timeout period during which the test message is not received through the second logical port.

A second embodiment can be described as a configuration program stored on a computer-readable medium, the program being used to perform a communication test between a first client computing element and a server computing element to discover the status of a port of the first client computing element, where the port is used in an application program that provides communication between the first client computing element and a second client computing element.

Other systems, methods, and/or computer program products according to embodiments will be or become apparent to one skilled in the art upon review of the following drawings and detailed description. It is intended that all such additional systems, methods, and/or computer program products be included within this description, be within the scope of the present disclosure.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in drawings, like reference numerals designate corresponding parts throughout the several views.

FIG. 13 shows a port status report screen of the software wizard program of FIG. 12.

DETAILED DESCRIPTION OF THE PREFERRED EMBODIMENTS

While the description below refers to certain exemplary embodiments, it is to be understood that the disclosure is not limited to these particular embodiments. On the contrary, the intent is to cover all alternatives, modifications and equivalents included within the spirit and scope of the disclosure. Also, the terminology used herein is for the purpose of description and not of limitation. As one example among many, while reference is made to "logical" ports, it will be understood that there exists various terms, such as "network" ports, that may also be used alternatively.

Figure 1:
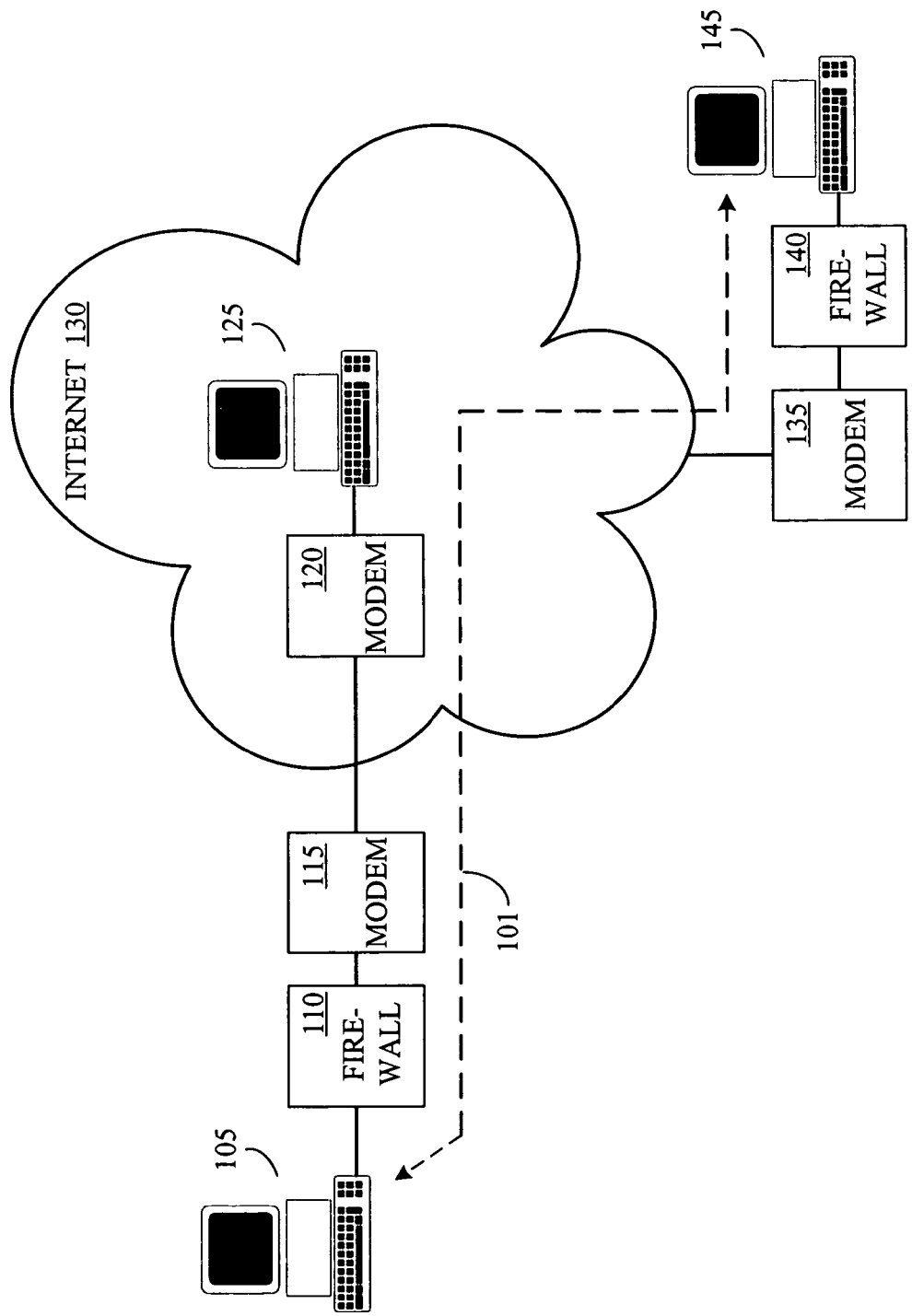
FIG. 1 is a prior art illustration of a first client element communicatively coupled to a second client element via a server element.
Figure 2:
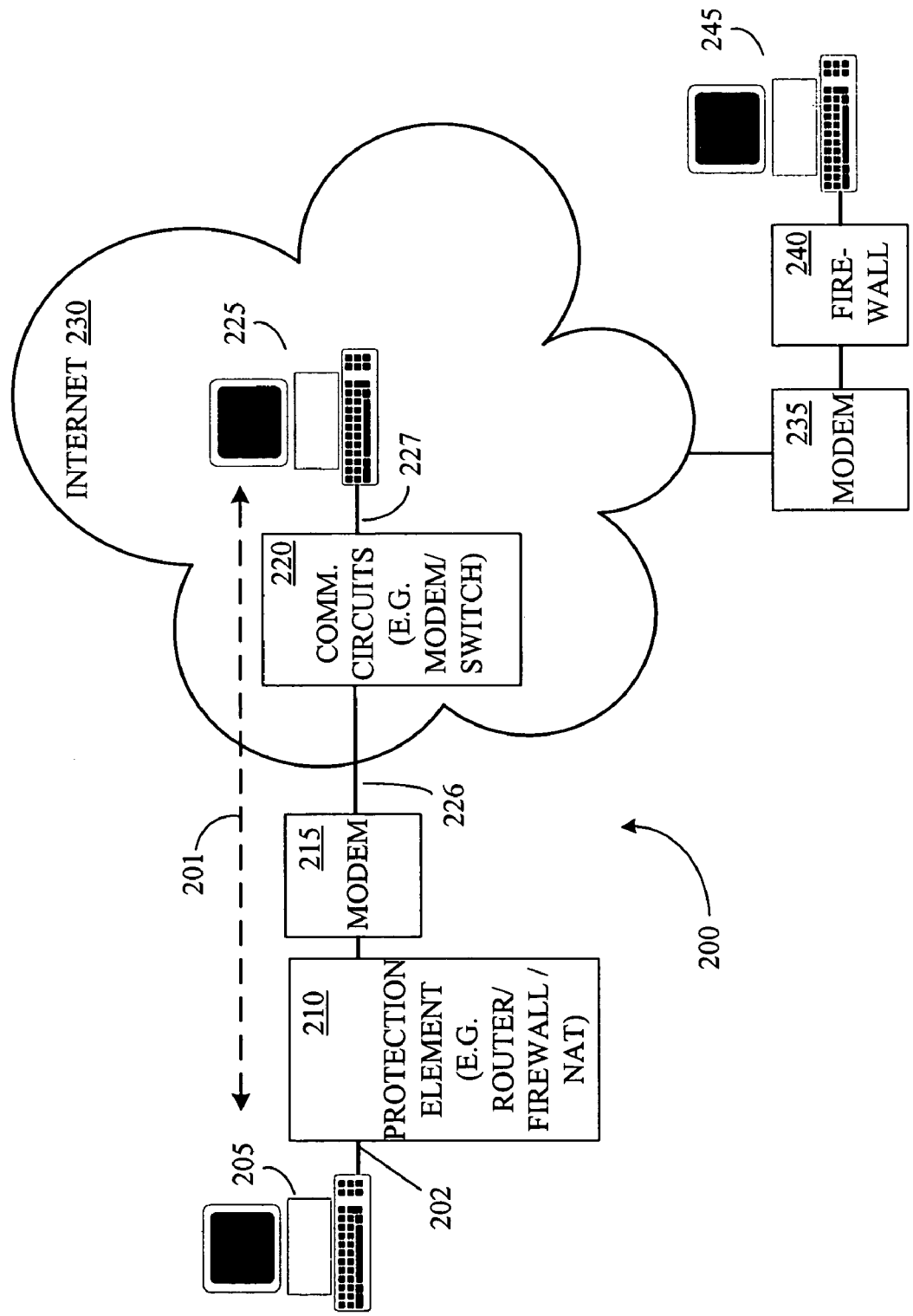
FIG. 2 shows a logical port configuration system comprising a first client computing element that is communicatively coupled to a second client computing element through a server computing element.

FIG. 2 illustrates one embodiment among many, of a logical port configuration system (LPCS) 200 comprising a first client computing element (first CCE) 205 that is communicatively coupled to a server computing element (SCE) 225. SCE 225, which is shown as a network element of Internet 230, further provides connectivity between first CCE 205 and a second client computing element (second CCE) 245 via one or more network elements (not shown) of Internet 230. In an alternative embodiment, SCE 225 may be a network element of a distributed network, such as a local area network (LAN) or a wide area network (WAN), rather than Internet 230. In such an alternative embodiment, Internet 230 of FIG. 2 may be replaced by a suitable network.

In the exemplary embodiment shown in FIG. 2, SCE 225 is typically located at an Internet Service Provider (ISP) facility, and provides Internet services to a user operating first CCE 205. Such a user may be a business user or a residential user. In the case of a business user, first CCE 205 may be a personal computer (PC) that may be one network element among several, of a local area network (LAN). In the case of a residential user, first CCE 205 may be a stand-alone PC or may be a networked PC that is part of a home LAN.

Protection element 210 of FIG. 2 represents one or more elements such as a router, a server, and/or a gateway, while optionally incorporating a firewall, a network address translation (NAT) unit, and/or a proxy server. In certain cases, protection element 210 as represented in FIG. 2, may be incorporated into first CCE 205. For example, if protection element 210 was configured to operate as a firewall, the firewall may be merely a software program resident inside first CCE 205.

In a transmit direction from PC 205, modem 215 converts the data that is provided by protection element 210 into a format that is suitable for transmission over link 226. When first CCE 205 is a residential PC, modem 215 can be a digital subscriber line (DSL) modem such as an asynchronous DSL (ADSL) modem operating into link 226 that is a subscriber local loop comprising a pair of copper wires. When first CCE 205 is a business PC, modem 215 can be a T-1 modem that operates via link 226 that is a T-1 line. In alternative embodiments, modems 215 and 220 and link 226 may constitute elements of a wireless media, an optical media, or other communications media.

In a receive direction towards PC 205, modem 215 receives data from link 226 and converts it into a format that is suitable for receiving by protection element 210 and/or first CCE 205. Modem 215 interacts with an appropriate modem that is shown as a part-of block 220 in Internet 230. It will be understood that block 220 represents one or more communication circuits, such as modems, communication switches, routers, and multiplexers.

Persons of ordinary skill in the art will recognize that operations performed by protection element 210 and/or modem 215 may be incorporated into first CCE 205. Modem 215 for example, can be an internal modem card, such as a plug-in card of a PC. Similarly, elements of block 220 may be also incorporated inside SCE 225.

The description provided above, for first CCE 205, protection element 210, and modem 215 may be further used to describe second CCE 245, element 240, and modem 235 of FIG. 2. It will be understood that elements equivalent to block 220 and SCE 225 will be typically used in Internet 230 to communicate with modem 235 that is associated with second CCE 245. For the sake of brevity, such elements are not shown in FIG. 2, and will be understood by persons of ordinary skill in the art. It will also be understood that these several equivalent elements need not be identical to one another respectively. For example, while modem 215 may be an ADSL modem, modem 235 may be a dial-up modem. Similarly, first CCE 205 may be a PC, while second CCE 245 may be a personal digital assistant (PDA). Furthermore, in alternative embodiments, first CCE 205 and/or second CCE 245 may comprise various computing elements such as, but not limited to, workstations, personal digital assistants, laptops, and other portable as well as non-portable computing devices.

Attention is now drawn to protection element 210, which in this exemplary embodiment may be a router. A user of first CCE 205 would typically configure the router to permit bi-directional communication over a first set of logical ports, uni-directional communication over a second set of logical ports, and to block all communications over a third set of logical ports. For example, well-known logical ports such as ports 80 and 8080, will typically be left unblocked so as to permit bi-directional access to Internet 230. Furthermore, port 80 will typically be configured to pass data through, not merely when an appropriate socket is associated with the data, but also, only when the data is formatted using a pre-determined transport format. For example, port 80, in this case, will be formatted to pass data formulated in hyper-text transport protocol (HTTP).

Protection element 210 may further incorporate NAT, which was developed as a mechanism to conserve IP addressing space. The popularity of the Internet has grown to such a state that the numbers of computers that can access the Internet vastly outnumber the number of available IP addresses. NAT makes use of the fact that certain IP addresses are segmented for private corporate networks and should not be placed on the public Internet.

Routers incorporating NAT translate the IP address used on a private network, such as a LAN that may be associated with first CCE 205, to an IP address suitable for the Internet 230. Such routers track the mapping of private IP addresses and private ports to external IP addresses and external ports. Using this method, external IP addresses can support multiple private IP addresses for services.

On the subject of protocols, the H.323 protocol comprises different standards and protocols. As a result of this H.323 calls are made up of several different simultaneous connections. Several of these connections are made to dynamic ports, thereby making H.323 a firewall-hostile protocol. H.323 calls can be initiated from outside the firewall, as well as from inside. This condition places a larger burden on traditional firewalls that are designed to block unauthorized incoming data. As one example of such a condition, for video conferencing to be successfully implemented on a LAN, internal users as well as external H.323 users should be allowed to establish calls through the firewall. The firewall configuration has to permit such a bi-directional flow, while distinguishing such flows from hostile data flows. To further complicate the issue, traditional NAT implementations did not take into account that IP address and port information may be present in the data portion of an IP packet. Additionally, firewalls did not take into account that unsolicited IP packets may be an attempt to establish a call between computers on either side of the firewall.

In one of several embodiments of LPCS 200, first CCE 205 interacts with SCE 225 via communication path 201, to configure logical ports associated with certain application programs such as Microsoft® NetMeeting,™ that are resident in first CCE 205. Once such a configuration is completed, a user of first CCE 205 can proceed with confidence that his device has been configured correctly to carry out for example, a Microsoft® NetMeeting™ link-up, with another computer. Consequently, if a fault were to be detected when this user attempts to communicate with a remote device, such as second CCE 245, the troubleshooting can be performed on other devices, rather than those at the PC 205 end of the link.

The port configuration can be carried out for one or more applications all at once, or on an individual basis. It will be understood that LPCS 200 can be operated for carrying out configuration of one or more port configurations for one or more applications, on an as-needed basis, so as to maintain optimal security settings of protection element 210. For example, while the user may decide to use Microsoft® NetMeeting™ during a first instance of time, and a BellSouth™ application during a second instance of time, the appropriate ports for Microsoft® NetMeeting™ can be configured during the first instance of time, while a different set of ports associated with the BellSouth™ application may be configured during the second instance of time. While one or more ports that may be uniquely associated with the BellSouth™ application may be optionally disabled during the first instance of time, similarly one or more ports uniquely associated with Microsoft® NetMeeting™ may also be optionally disabled during the second instance of time. Operation of LPCS 200 will be explained further using other figures.

Figure 3:
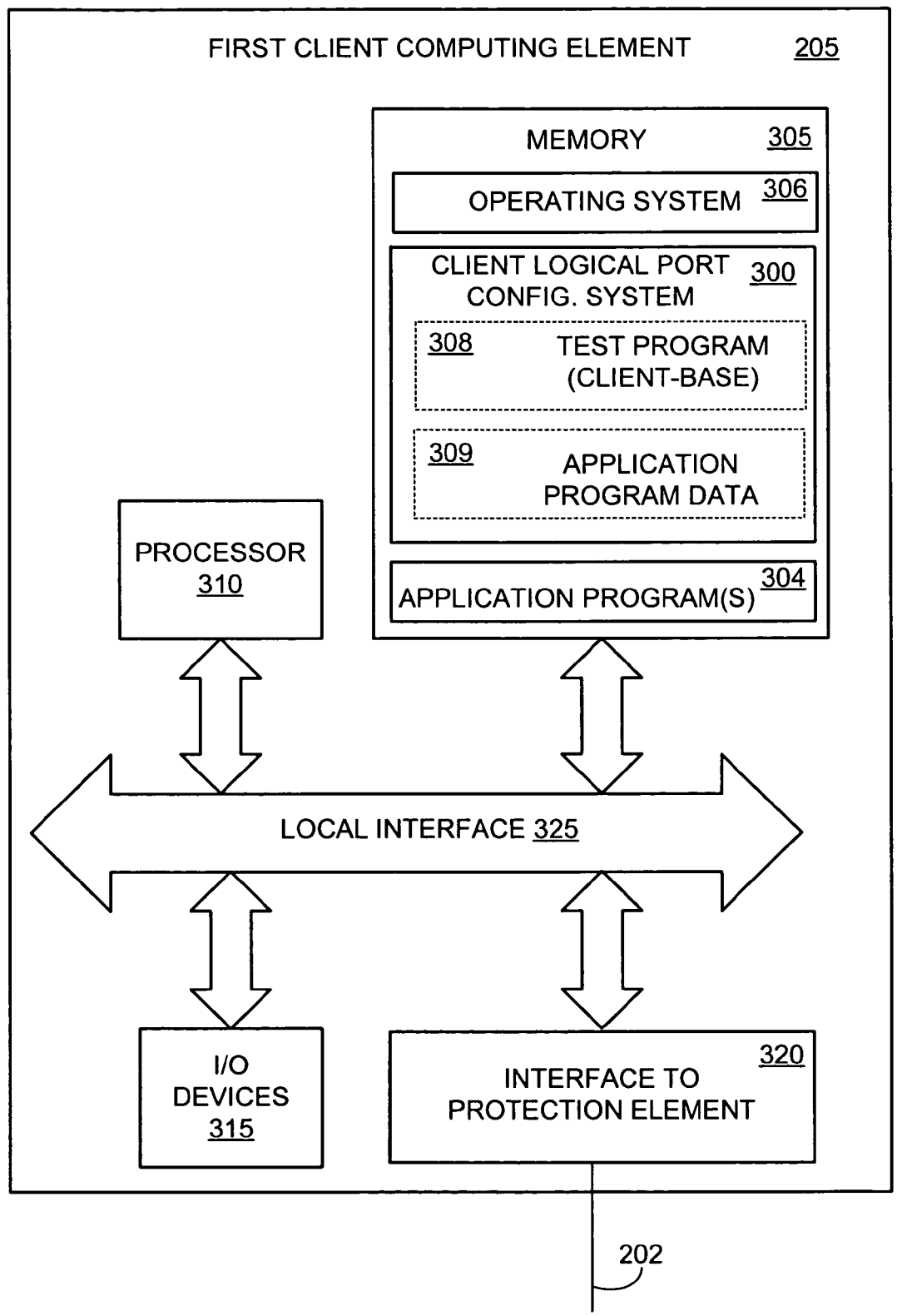
FIG. 3 is a block diagram illustrating various functional blocks incorporated inside the first client computing element of FIG. 2.

FIG. 3 is a block diagram illustrating various functional blocks incorporated inside first CCE 205 of LPCS 200. Generally, in terms of hardware architecture, first CCE 205 includes a processor 310, memory 305, an interface to a protection element 320, and one or more input and/or output (I/O) devices 315 (or peripherals) that are communicatively coupled via a local interface 325. It will be understood that additional blocks such as a LAN network interface, a WAN network interface, and a high-speed digital I/O may also be incorporated into the block diagram of FIG. 3.

The local interface 325 can be, for example but not limited to, one or more buses or other wired or wireless connections, as is known in the art. The local interface 325 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 310 is a hardware device for executing software, particularly that stored in memory 305. The processor 310 can be any custom made or commercially available processor, a central processing unit (CPU), an auxiliary processor among several processors associated with the first CCE 205, a semiconductor based microprocessor (in the form of a microchip or chip set), a macroprocessor, or generally any device for executing software instructions.

The memory 305 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 305 may incorporate electronic, magnetic, optical, and/or other types of storage media. Note that the memory 305 can have a distributed architecture, where various components are situated remote from one another, but can be accessed by the processor 310.

The software in memory 305 may include one or more separate programs, each of which comprises an ordered listing of executable instructions for implementing logical functions. In the example of FIG. 3, the software in the memory 305 includes a Client LPCS (CLPCS) 300 that is one among several embodiments of the present disclosure, an application program 304, and a suitable operating system (O/S) 306. A nonexhaustive list of examples of suitable commercially available operating systems 306 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; or (f) an-appliance-based operating system, such as that implemented in handheld computers or personal data assistants (PDAs) (e.g., PalmOS available from Palm Computing, Inc., and Windows CE available from Microsoft Corporation). The operating system 306 essentially controls the execution of other computer programs, such as CLPCS 300, and provides scheduling, input-output control, file and data management, memory management, and communication control and related services.

The CLPCS 300 may be implemented using logic incorporated in programs such as a source program, executable program (object code), script, or any other entity comprising a set of instructions to be performed. When a source program, then the program needs to be translated via a compiler, assembler, interpreter, or the like, which may or may not be included within the memory 305, so as to operate properly in connection with the O/S 306. Furthermore, the CLPCS 300 can be written as (a) an object oriented programming language, which has classes of data and methods, or (b) a procedure programming language, which has routines, subroutines, and/or functions, for example but not limited to, XML, C, C++, Pascal, Basic, Fortran, Cobol, Perl, Java, and Ada.

The I/O devices 315 may include input devices, for example but not limited to, a keyboard, mouse, scanner, microphone, etc. Furthermore, the I/O devices 315 may also include output devices, for example but not limited to, a printer, display, etc. Finally, the I/O devices 315 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the first CCE 205 is a PC, workstation, or the like, the software in the memory 305 may further include a basic input output system (BIOS) (omitted for simplicity). The BIOS is a set of essential software routines that initialize and test hardware at startup, start the O/S 306, and support the transfer of data among the hardware devices. The BIOS is stored in ROM so that the BIOS can be executed when the first CCE 205 is activated.

When the first CCE 205 is in operation, the processor 310 is configured to execute software stored within the memory 305, to communicate data to and from the memory 305, and to generally control operations of the first CCE 205 pursuant to the software. The CLPCS 300 and the O/S 306, in whole or in part, but typically the latter, are read by the processor 310, perhaps buffered within the processor 310, and then executed.

When the CLPCS 300 is implemented in software, as is shown in FIG. 3 hereafter, it should be noted that the CLPCS 300 can be stored on any computer readable medium for use by or in connection with any computer related system or method. For example, the CLPCS 300 may be detailed in a computer program or script that runs on a stand-alone server, a network server, or on one or more computers that are part of a network.

In the context of this document, a computer readable medium is an electronic, magnetic, optical, or other physical device or means that can contain or store a computer program for use by or in connection with a computer related system or method. The CLPCS 300 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the CLPCS 300 is implemented using hardware logic, the CLPCS 300 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The hardware can be housed in a stand-alone computer or in one or more computers of a network.

Drawing attention to CLPCS 300 of FIG. 3, two functional blocks among many are shown as a client-based test program 308 and application program data 309. While client-based test program 308 and application program data 309 are shown in FIG. 3 as two separate blocks, this illustration has been done merely for the sake of convenience in describing their operations. Both programs can be integrated into a single program. Other functional blocks that operate to implement CLPCS 300 have not been shown, and will be understood in the context of implementations as described in the following pages.

Client-based test program 308 interacts with a server-based test program, which will be described later, to set up a bi-directional communication link between a client device such as first CCE 205, and a server device such as SCE 225, to configure the logical ports associated with one or more application programs of the client device. Such programs are a part of the block titled "application program 304" which may comprise one or more programs such as, but not limited to, Microsoft NetMeeting,™ CuSeeMe,™ BellSouth™ video chat, and various instant messaging, video chat, and/or audio communication programs.

Application program data 309 typically contains information related to operating the various application programs. Such information includes logical port configuration data and may further include dataflow information related to these programs. As one example, Application program data 309 may include port configuration data relating to Microsoft NetMeeting,™ as shown below:

| Port | Function |
| --- | --- |
| 389 | Internet Locator Service (TCP) |
| 522 | User Location Service (TCP) |
| 1503 | T.120 (TCP) |
| 1720 | H.323 call setup (TCP) |
| 1731 | Audio call control (TCP) |

-continued

| Port | Function |
| --- | --- |
| Dynamic | H.323 call control (TCP) |
| Dynamic | H.323 streaming (RTP over UDP) |

The data may further include operational details such as for example, how to establish outbound Microsoft NetMeeting™ connections through a firewall. Such details may include the following steps:

Pass though primary TCP connections on ports 389, 522, 1503, 1720, and 1731.

Pass through secondary TCP and UDP connections on dynamically assigned ports (1024-65535).

CLPCS 300 will use this information to suitably configure the logical ports of the client device if Microsoft NetMeeting™ is desired to be used upon the client device.

Furthermore, it will be understood that the data stored in Application program data 309 may include data for application programs that may not necessarily be currently available in Application program 304. For example, the data for operating CuSeeMe™ may be a part of Application program data 309, even though the user has not installed this application on first CCE 205. This permits a manufacturer to load a wide variety of application data, thereby allowing the user to decide when and if the corresponding application program is to be installed and/or operated on his computer.

Figure 4:
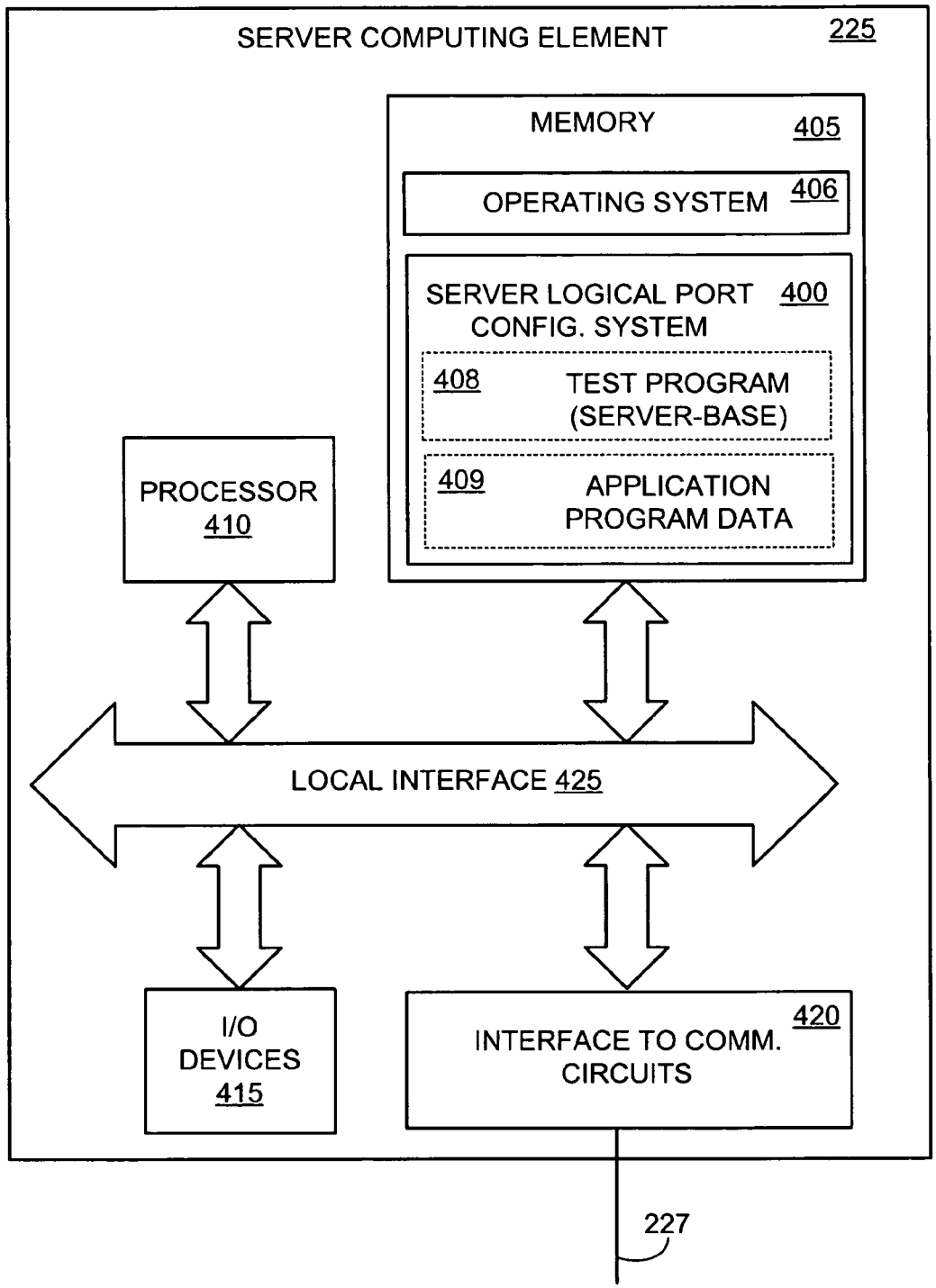
FIG. 4 is a block diagram illustrating various functional blocks incorporated inside the server computing element of FIG. 2.

FIG. 4 is a block diagram illustrating various functional blocks incorporated inside SCE 225, which is a part of LPCS 200. Generally, in terms of hardware architecture, SCE 225 includes a processor 410, memory 405, an interface to communication circuits 420, and one or more input and/or output (I/O) devices 415 (or peripherals) that are communicatively coupled via a local interface 425. It will be understood by persons of ordinary skill in the art, that the description of the hardware in FIG. 4 may be generally understood from the description provided for the equivalent hardware blocks shown in FIG. 3.

Drawing attention to SLPCS 400 of FIG. 4, two functional blocks among many are shown as a server-based test program 408 and application program data 409. While server-based test program 408 and application program data 409 are shown in FIG. 4 as two separate blocks, this illustration has been done merely for the sake of convenience in describing their operations. Both programs can be integrated into a single program. Other functional blocks that operate to implement SLPCS 400 have not been shown, and will be understood in the context of implementations as described in the following pages.

Server-based test program 408 interacts with the client-based test program 308 of FIG. 3, to configure the logical ports associated with the client device.

Application program data 409 typically contains information related to various application programs that are used on a client device such as first CCE 205. Such information may be similar to that stored in application program data 309 of FIG. 3. In addition, application program data 409, may include information related to various other application programs that may be used by several additional client devices that are served by SCE 225, in addition to first CCE 205. This information storage is to enable providing logical port configuration systems to multiple client devices that may be served by SCE 225.

Figure 5:
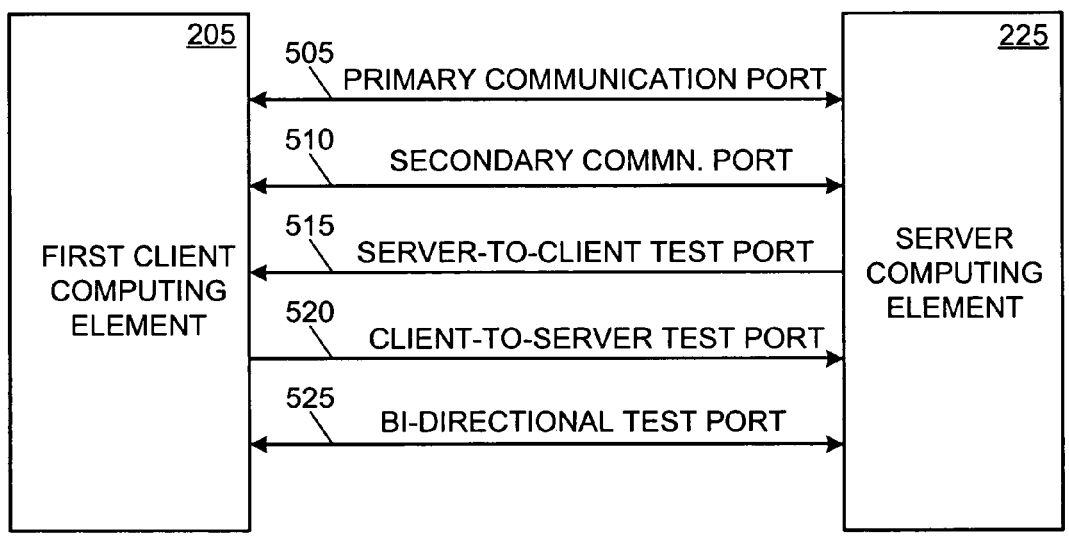
FIG. 5 is a block diagram showing some logical connections between the first client computing element and the server computing element of FIG. 2.

FIG. 5 shows some logical connections of LPCS 200 that exist between first CCE 205 and SCE 225. Primary connection port (PCP) 505 is a command and control port that has been pre-selected for use by LPCS 200. PCP 505 may either comprise a well-known port, such as port 80, or may alternatively utilize a port that has been identified for use by both computing elements. Secondary connection port (SCP) 510 is a second command and control port that may also comprise a well-known port such as 8080, or an alternative pre-defined port.

In one exemplary embodiment, SCP 510 comprises a back-up connection in case of failure of PCP 505. In other alternative embodiments, both ports may be used simultaneously. For example, the two ports may be configured as two uni-directional connections, rather than the two bi-directional connections that are shown in the example of FIG. 5.

Server-to-client test port (SCTP) 515 is one example of potentially several, uni-directional (server-to-client) port connections that is intended for use by an application program resident in the first CCE 205. SCTP 515 is one of the ports that may be configured by LPCS 200.

Client-to-server test port (CSTP) 520 is one example of potentially several, uni-directional (client-to-server) port connections that is intended for use by an application program resident in the first CCE 205. CSTP 520 is one of the ports that may be configured by LPCS 200.

Bi-directional test-port (BTP) 525 is one example of potentially several, bi-directional port connections that is intended for use by an application program resident in the first CCE 205. BTP 525 is one of the ports that may be configured by LPCS 200.

To illustrate operations of these connections, in one of several examples, first CCE 205 transmits a request to SCE 225 for conducting a test on a port 1720. The request is transmitted via PCP 505 and/or SCP 510. Port 1720, which is a H.323 call setup (TCP) port for a Microsoft™ NetMeeting application that is resident in first CCE 205, is represented by BTP 525 of FIG. 5. LPCS 200 conducts a test/configuration of BTP 525, which in this case is 1720, to verify that the port is operational and can be used for the Microsoft™ NetMeeting application. The results of the test may be transmitted from SCE 225 to first CCE 205 via one or both communications ports, or alternatively the results may be derived by first CCE 205 as a direct result of the transmission via BTP 525. The test and/or configuration routines will now be explained with reference to flow charts in other figures.

Figure 6:
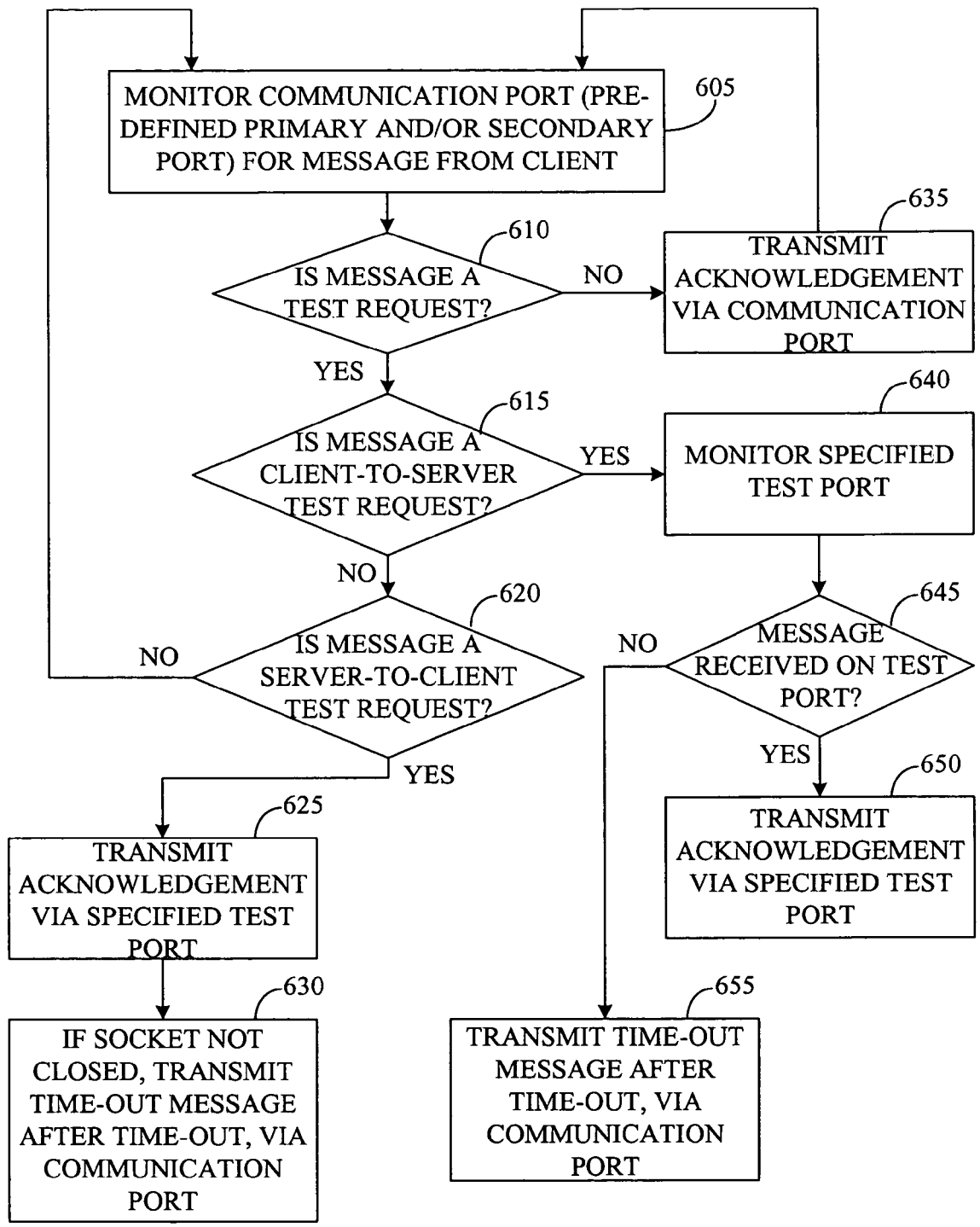
FIG. 6 is a flowchart that provides further details of a method of operation of a server-based logical port configuration system that is part of the logical port configuration system of FIG. 2.

FIG. 6 is a flowchart to describe one embodiment, among several embodiments, of a logical port configuration system that is resident on a server, such as SLPCS 400 of FIG. 4. SLPCS 400 is one component of LPCS 200. It is to be understood that any process steps or blocks shown in FIG. 6 as well as in other figures depicting flow-charts, represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved. Code may also be contained in several devices of the disclosure, and may not be necessarily confined to any particular device. The explanation below, while possibly implying code residency and functionality in certain devices, does so solely for the purposes of explaining the concept behind the disclosure, and the description should not be construed as a limiting parameter for the disclosure's various implementations in other applications.

Drawing attention to FIG. 6, in block 605, a server element such as SCE 225, monitors one or more communication ports such as PCP 505 and SCP 510 of FIG. 5, to listen for a message from a client element such as first CCE 205. As there may be several client elements logically connected to SCE 225, the SCE 225 identifies a client element based on a socket that is transmitted by the client element. This identification is used to provide the client element an appropriate response to a WANIP request.

If the message is not a test request, as identified in decision block 610, an acknowledgement response such as a WANIP response is transmitted back to the client element (block 635) via the appropriate communication port. If the message is a test request, decision block 615 is implemented to check whether the message relates to a client-to-server test of a specified port. If yes, the server element monitors the specified port for a message from the client. This is shown in block 640. Furthermore, a timer is initialized to provide a time-out function if such a message is not received over the specified port after a pre-determined period of time. Such a non-receipt may occur due to a failure of client-to-server transmission over the specified port. A "transmit time-out" message is then sent, in block 655, by the server element to the client element via one or more of the communication ports.

On the other hand, if a message is received on the specified port, in block 650, the server element transmits an acknowledgement message via the specified port. The client element may then conclude, based on receipt of such an acknowledgement message, that the specified port is valid and configured for use by one or more application programs.

Drawing attention back to decision block 615, if the message is not a client-to-server test request, decision block 620 is implemented. If decision block 620 indicates a server-to-client port test request, the server element transmits an acknowledgement message via the specified port (action shown in block 625). The client element can judge from receipt of such a message that the port has been configured correctly. Upon successful receipt, the client closes the socket.

If the socket from the client is not closed before a pre-determined period of time, in block 630, the server element transmits a time-out message via one or more of the communication ports. Such an action would indicate to the client that the port has not been configured appropriately.

Figure 7:
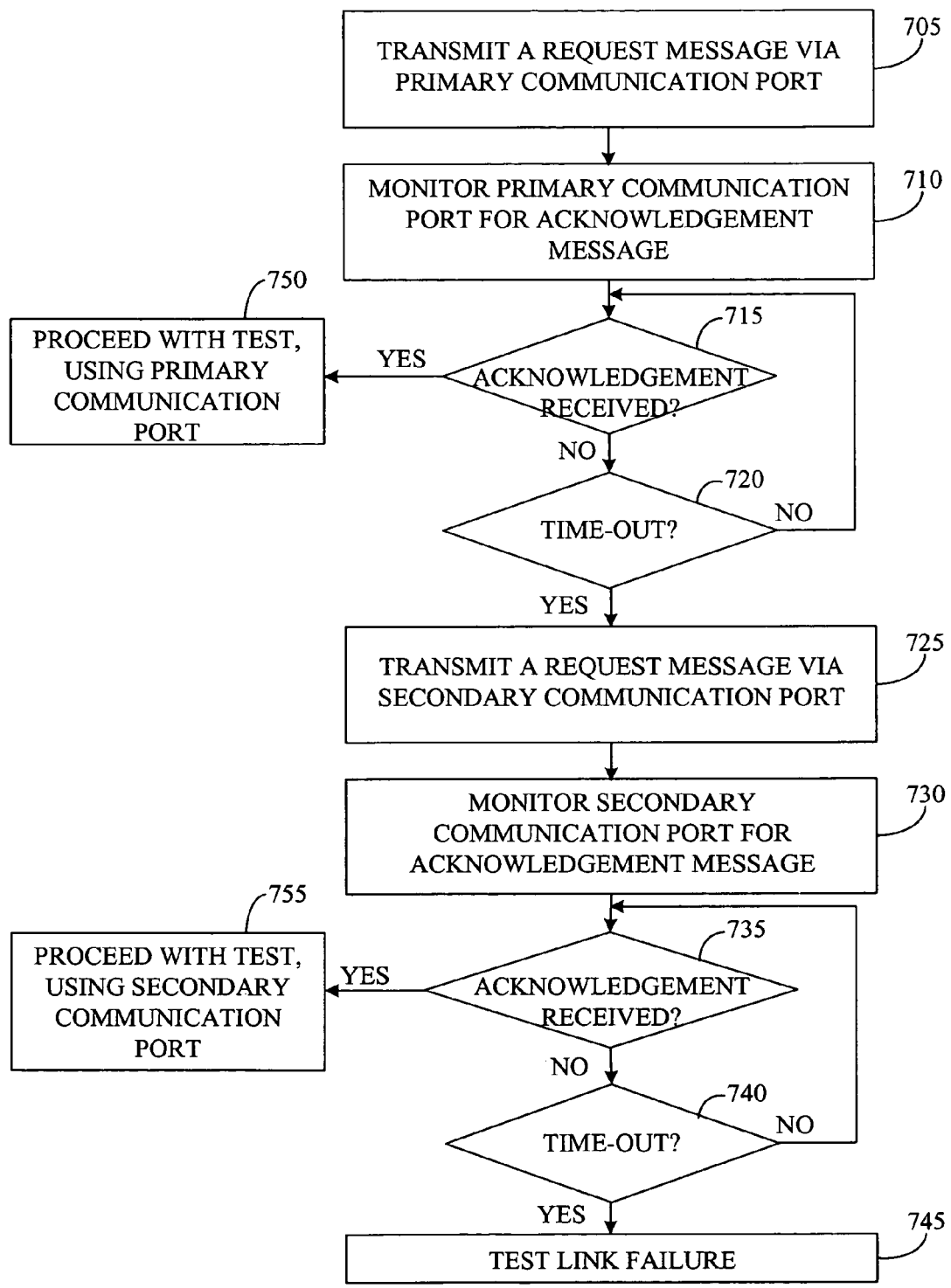
FIG. 7 is a flowchart that provides further details of a method of operation of a client-based logical port configuration system that is part of the logical port configuration system of FIG. 2.

Attention is now drawn to FIG. 7, which shows a flow chart to describe one embodiment, among several embodiments, of a logical port configuration system that is resident on a client element, such as CLPCS 300 of FIG. 3. CLPCS 300 is one component of LPCS 200. In block 705, a client element such as first CCE 205, transmits a request message to a server via the primary communication port. The request message may comprise a handshake communication wherein the client element transmits a WANIP request to the server element.

The client element then initializes a time-out timer and starts monitoring the primary communication port for an acknowledgement message, as indicated in block 710. The acknowledgement message, may, for example, be a response to the WANIP request. If an acknowledgement is received, as verified in decision block 715, the client element proceeds with block 750 where testing is carried out using the primary communication port. The testing will be described in more detail using other flow charts.

If an acknowledgement is not received in block 715, and a timeout has occurred (as indicated by the time-out timer associated with decision block 720), the client element implements block 725. In block 725, a second request message is transmitted to the server element via the secondary communication port. Blocks 730, 735, 740 and 755 operate in a manner similar to blocks 710, 715, 720 and 750, to carry out testing via the secondary communication port. If a timeout occurs in block 740, the test is terminated and the client concludes that there is a link failure between the client and server elements. While the link failure may be of a logical nature, the failure can also be caused due to a physical failure on the link.

Figure 8:
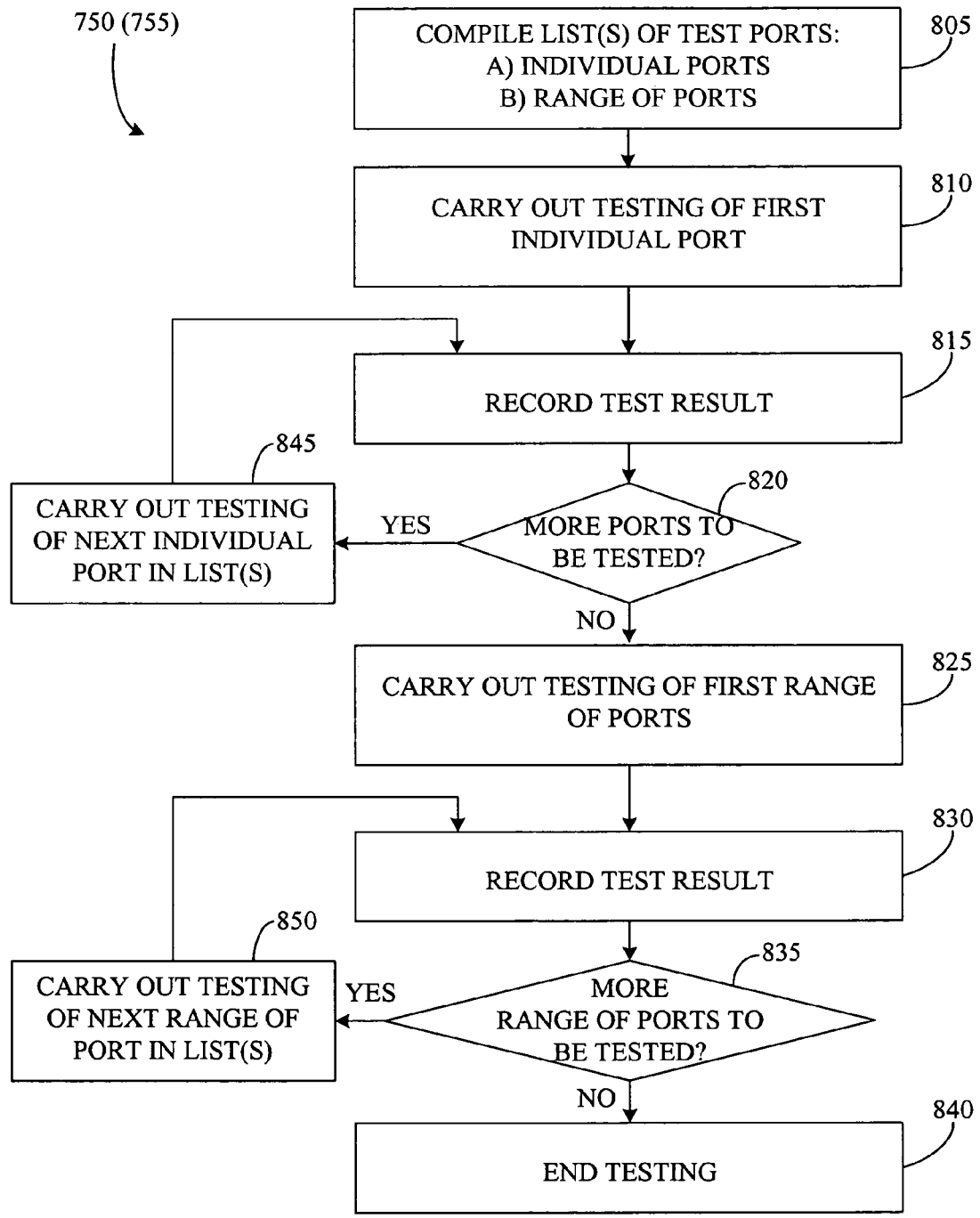
FIG. 8 is a flowchart that provides further details of a method of operation of a test using the primary and/or secondary communication ports, where the test is a part of the client-based logical port configuration system of FIG. 7.

Attention is now drawn to FIG. 8, which explains in more detail the testing that was referred to in blocks 750 and 755 of FIG. 7. In block 805, the client element compiles one or more lists of logical ports that are associated with one or more application programs resident in the client element. For example, the list may comprise ports 389, 522, 1503, 1720, 1731, and two dynamic ports, that are associated with Microsoft™ Netmeeting. The list may further comprise operating characteristics of each of these ports. These characteristics may for example, comprise transmission direction, transmission protocol, and/or information relative to a protection element that may be associated with the client element.

Such information may be procured by the client element in several alternative ways. For example, information relative to a protection element may be procured by a communication process between the client element and the protection element, using the communication ports depicted in FIG. 5. FIG. 5 may, in this case, be modified by replacing server computing element 225 with the protection element. The flow charts of the various figures may then be utilized on this modified set-up to obtain information about the protection element. Such processes may be particularly relevant when the protection element comprises a proxy server.

Drawing attention back to block 805, the list may be broadly categorized, in one exemplary embodiment, by two categories. The first category comprises individual ports, while the second category comprises a range of ports. A range of ports may be used when a contiguous set of ports are to be tested and/or used by an application program. One example among several, of a range of ports, relates to dynamic ports. Such ports may be dynamically assigned and consequently no specific port is specified for an application. If four such dynamic ports are needed for running the application, the client element may opt to use a range of four ports by specifying a range of, for example, 450 to 453.

The first port in the list of individual ports, is then tested in block 810. The testing will be described in more detail using other figures. The results of this testing will be recorded, as shown in block 815. Additional individual ports, if any, will be tested via blocks 820 to 845. After all the individual ports have been tested, block 825 is implemented to carry out testing of the one or more ranges of ports. This testing is indicated in blocks 830, 835, and 850. Block 840 indicates termination of testing.

Figure 9:
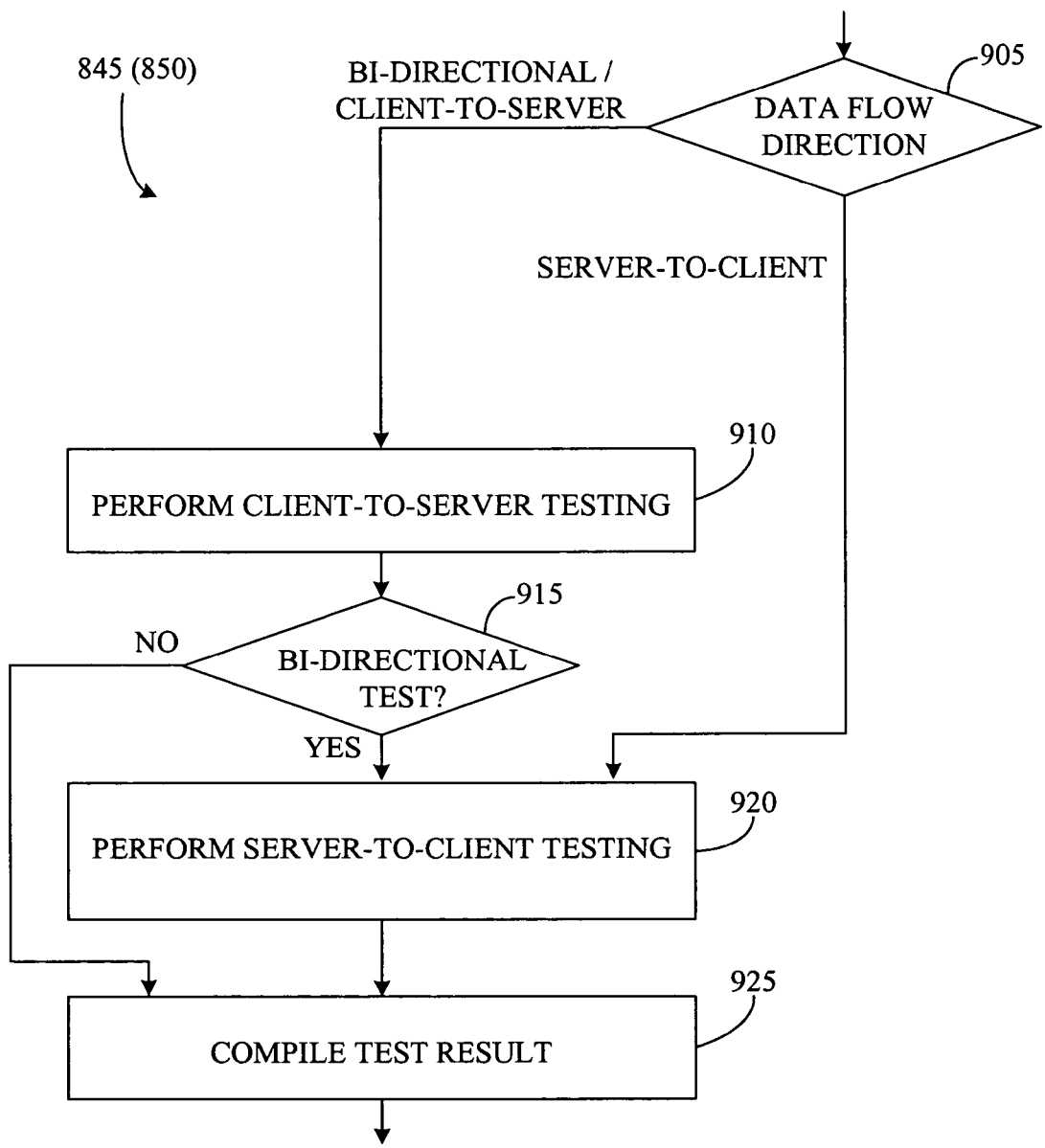
FIG. 9 is a flowchart that provides further details of a method of operation of a test of individual and/or a range of ports, where the test is part of the test illustrated in FIG. 8.

Turning to FIG. 9, which is a flow chart that provides further details of testing that was referred to in blocks 845 and 850 of FIG. 8, block 905 is a decision block to determine the direction of test data flow between a client element, such as first CCE 205, and a server element, such as SCE 225. If testing from server-to-client direction has to be performed, as determined in block 905, block 920 is implemented. In block 920, server-to-client direction testing is carried out. This test is explained later in more detail using FIG. 11.

If the determination in block 905 indicates bi-directional and/or client-to-server test data flow, block 910 is implemented. The client-to-server testing that is performed in block 910 is explained in more detail using FIG. 10. In block 915, a determination is made if bi-directional testing is to be performed. If such testing is not desired, block 925 is implemented, wherein the test results are compiled and the tests terminated. On the other hand, if bi-directional testing is required block 920 is implemented. Because client-to-server direction testing was already performed in block 910, testing of the other half of the bi-directional path, which is the server-to-client direction, is then carried out in block 920. Once the testing of block 920 has been completed, the test results are compiled in block 925, and testing is terminated.

Figure 10:
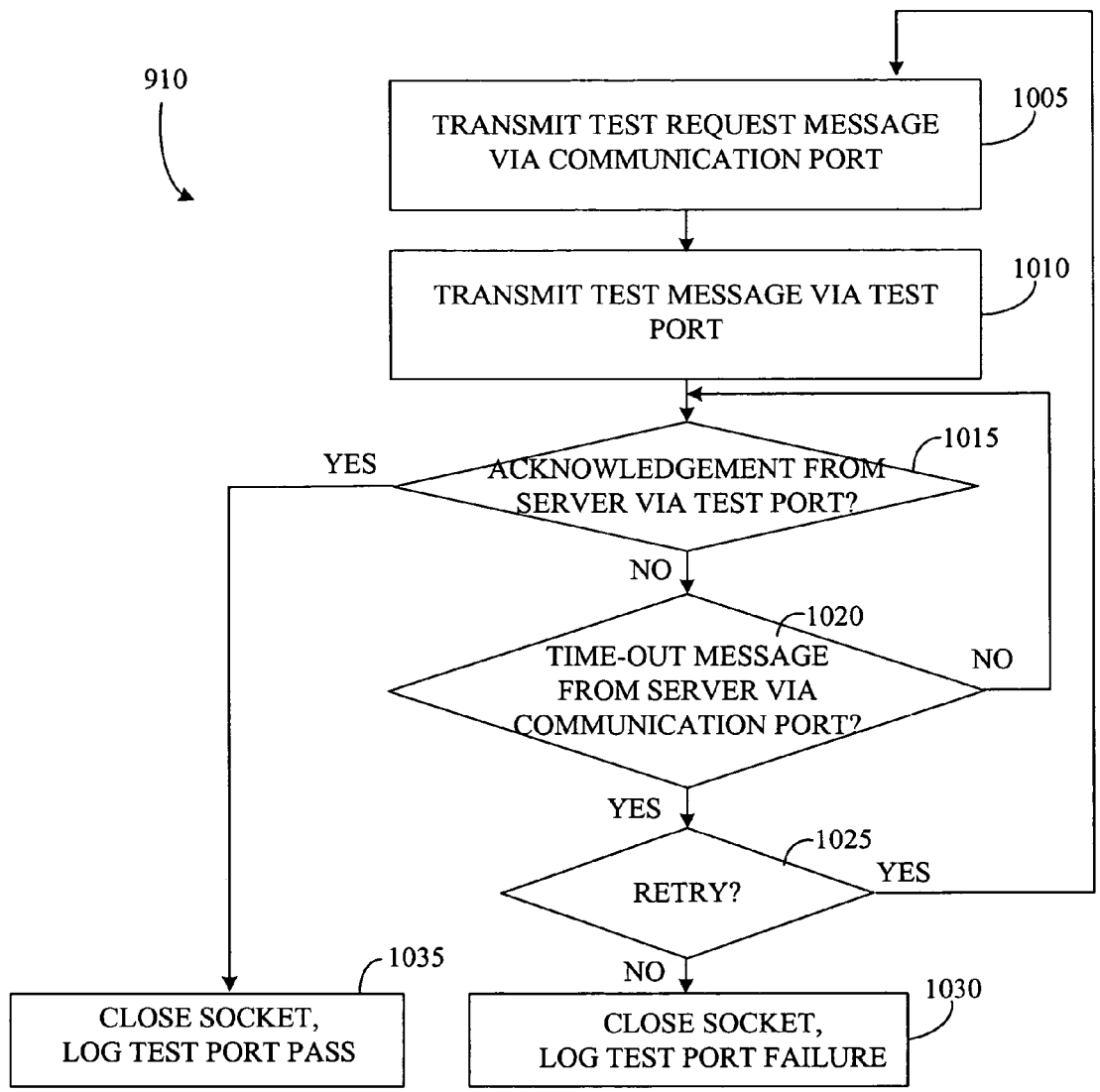
FIG. 10 is a flowchart that provides further details of a method of operation of a test of uni-directional and bi-directional ports, where the test is part of the test illustrated in FIG. 9.

Attention is now drawn to FIG. 10, which is a flow chart of the client-to-server testing that was indicated in block 910 of FIG. 9. In block 1005, a test request is transmitted by a client element to a server element, via the primary and/or secondary communication port. This is followed by block 1010, wherein a test message is transmitted through the appropriate test port in the client-to-server direction. In decision block 1015 a determination is made if an acknowledgement has been received from the server via the test port that was specified in the test request. As explained earlier, if the test port connection is invalid, the server transmits a time-out message through the communication port. This is checked by the client element (block 1020). If such a time-out message is received, another test attempt is carried out, subject to a re-try attempt being desirable (block 1025). If a re-try attempt is not desired, the socket between client and server elements is closed, and a test port failure result is logged in block 1030.

Drawing attention back to block 1015, if an acknowledgement is received by the client element from the server element, thereby indicating a valid, functioning port, block 1035 is implemented. Herein, the socket is closed and a test port pass result is logged.

Figure 11:
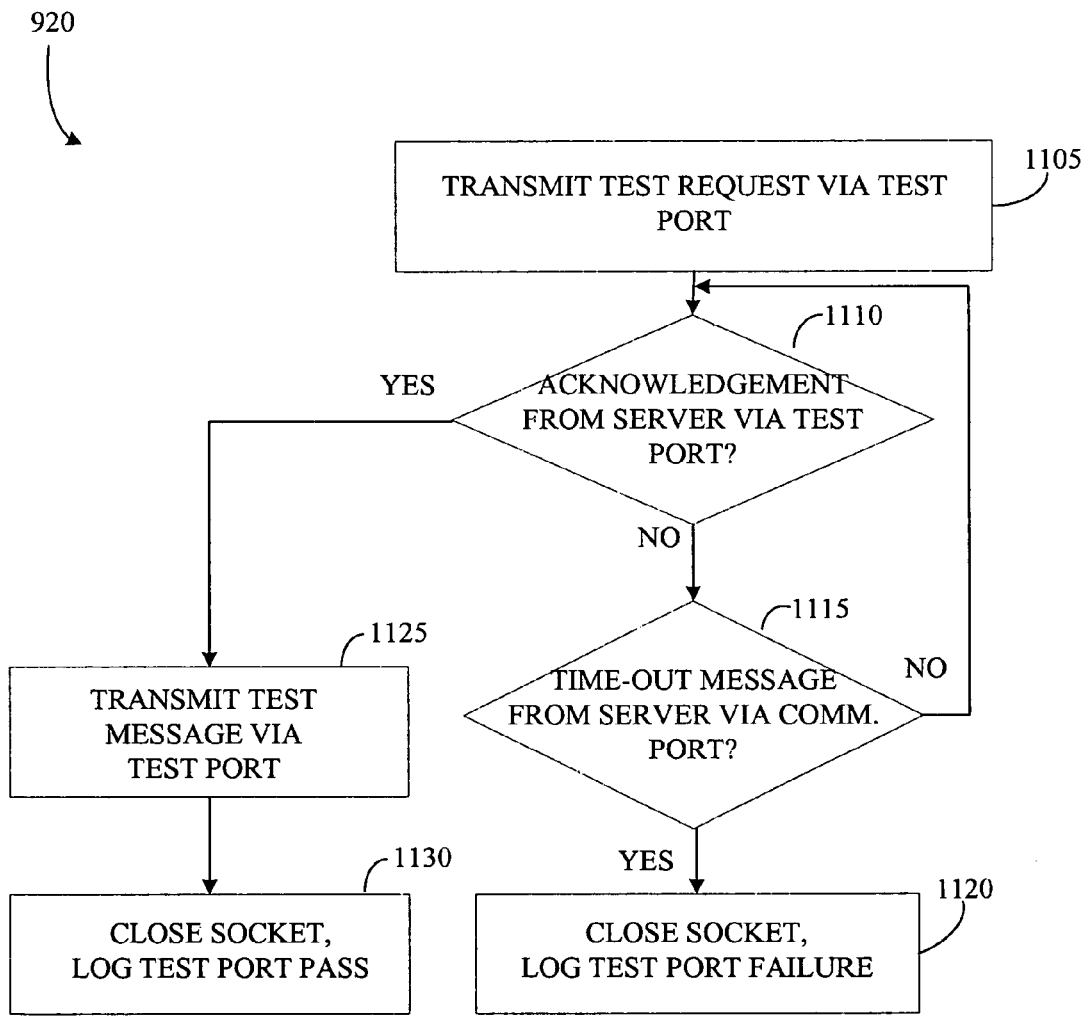
FIG. 11 is a flowchart that provides further details of a method of operation of a client-to-server direction port test, where the test is part of the test illustrated in FIG. 10.

FIG. 11 is a flow chart of the server-to-client testing that was indicated in block 920 of FIG. 9. In block 1105, a test request is transmitted by a client element to a server element via the primary and/or secondary communication port. This is followed by block 1110 wherein a determination is made if an acknowledgement has been received from the server via the test port that was specified in the test request. If such an acknowledgement has not been received, a determination is made in block 1115 if a time-out message has been received from the server via the communication port. If such a time-out message is received, thereby indicating failure of the test port, the failure result is logged and the test terminated (block 1120). On the other hand, if an acknowledgement is received via the test port, in block 1110, the client element transmits to the server, an acknowledgement via the communication port. The socket is also closed at this time (block 1125). In block 1130, which follows block 1125, the test pass result is logged, and the test terminated.

Figure 12:
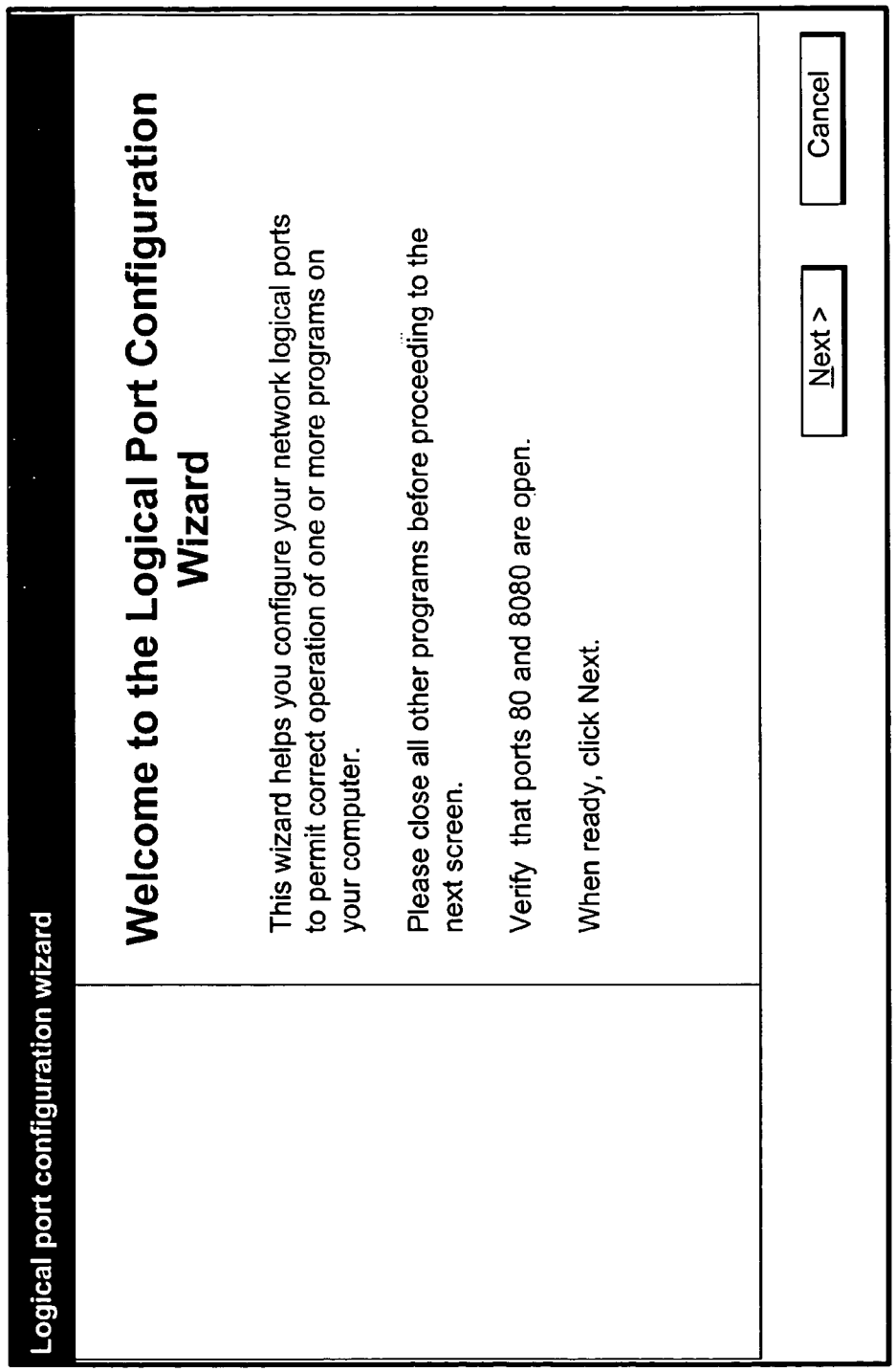
FIG. 12 shows a welcome screen of a software wizard program to implement the logical port configuration system of FIG. 2.

FIG. 12 is one example among many, of a screen of a software wizard of a LPCS, such as logical port configuration system, such as LPCS 200 of FIG. 2. The screen of FIG. 12, is a welcome screen that provides instructions to a user of a client element such as first CCE 205, for configuring one or more logic ports associated with one or more software application programs. In this example, one of the instructions recommends that the user verify that ports 80 and 8080 are open. Port 80 may be the designated primary communication and control port, while port 8080 may be the designated secondary communication and control port for the LPCS. It will be understood, that any other suitable ports may be used in place of ports 80 and 8080. These ports have been mentioned here merely for purposes of illustration.

FIG. 13 is a second example of a screen of the software wizard that was mentioned with reference to FIG. 12. This screen provides a port status report after the testing of these ports has been conducted. It can be seen that port 1720 has passed, while port 1503 has failed.

Figure 14:
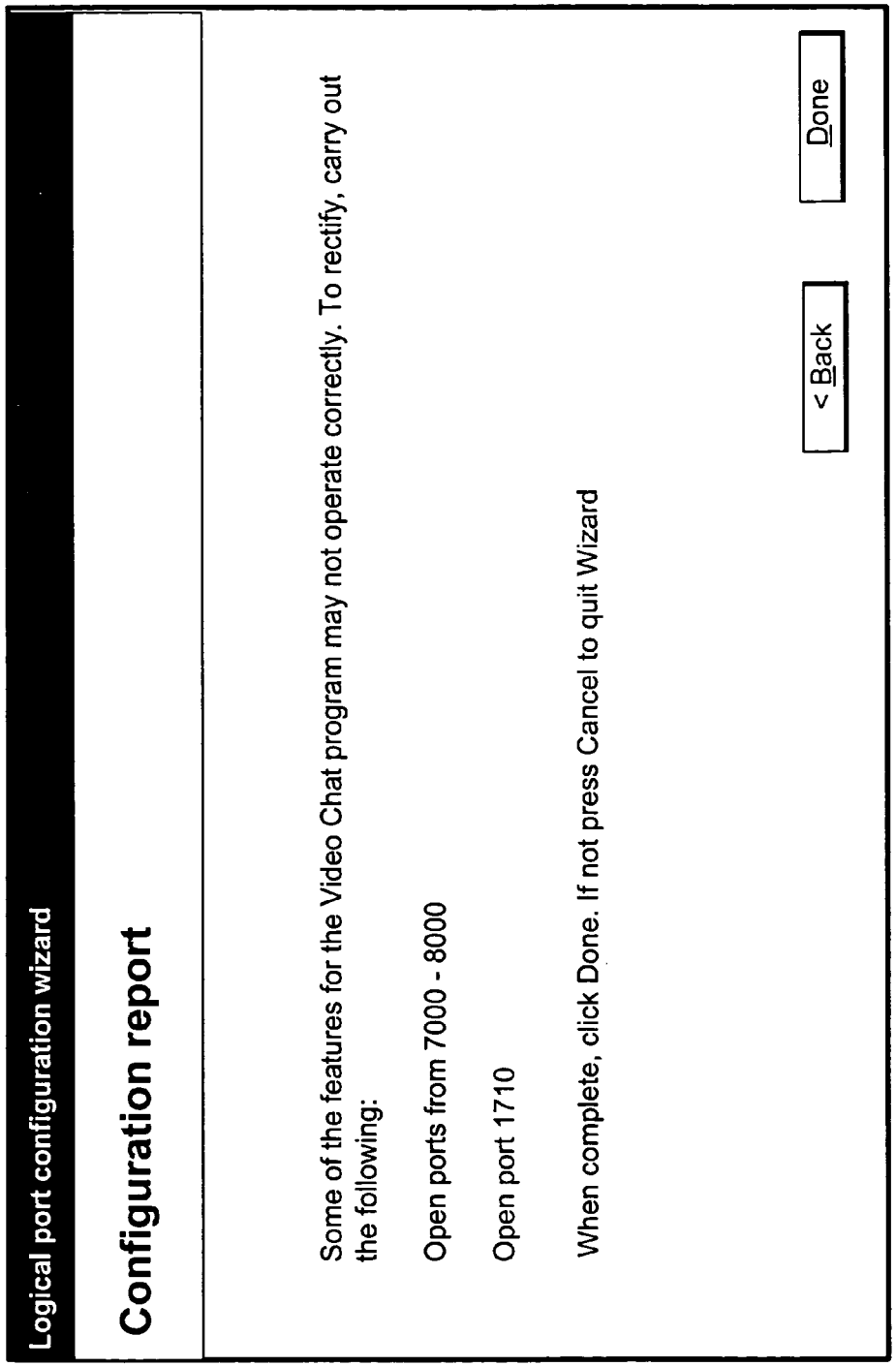
FIG. 14 shows a configuration report screen of the software wizard program of FIG. 12

FIG. 14 is a third example of a screen of the software wizard that was mentioned with reference to FIGS. 12 and 13. This screen is a configuration report that suggests to the user, one or more operations that may be performed to rectify port failures detected during the testing. It will be understood, that FIG. 14 merely provides one example among many of such a report. In an alternative embodiment, the client element communicates with a protection element, such as a firewall or a router, to obtain device information that is specific to this particular protection element, and provides a configuration report to the user. Such a report may be specifically tailored, based on specific characteristics of the protection element and may provide greater details on how the user can configure not only the client element, but also the specific protection element.

In other alternative embodiments of the software wizard, information using other techniques such as icons, symbols, pictures, graphs, tables, and network diagrams to name a few among many, may also be used. Persons of ordinary skill in the art will understand that such techniques provide for an effective graphical user interface.

It should be emphasized that the above-described embodiments are merely possible examples of implementations and are set forth merely for providing a clear understanding of the principles. Many variations and modifications may be made to the above-described embodiment(s) of the disclosure without departing substantially from the spirit and principles of the disclosure. As one example, among many, while the flowcharts illustrate test initiation from a client device to a server device, the test/configuration method can be equally applied from the server to the client device. Such an application may be applicable where a server is used to configure a client device. All such modifications and variations are intended to be included herein within the scope of this disclosure.

I claim:

1. A logical port configuration system comprising:
    a first communication port configured to send a first request message to a server computing element;
    a monitoring component configured to monitor the first communication port for an acknowledgement message from the server computing component; and
    a testing component configured to, in response to an acknowledgement message being received, initiate a port test at the first communication port, the port test configured to facilitate interaction between the client computing element and the server computing element,
    wherein, during the port test, the server computing element communicatively interacts with the client computing element to discover a port status of the first communication port, the first communication port of the client computing element being associated with an application program operative on the client computing element, wherein in response to an acknowledgement message not being received, a determination is made whether a timeout timer has expired, and wherein in response to a determination that the timeout timer has expired, a second request message is sent to the server computing component, via a secondary communications port.

2. The system of claim 1, wherein the server computing element configured to receive a test initiation command that is transmitted by the client computing element using a first Internet Protocol socket.

3. The system of claim 2, wherein the client computing element is configured to communicatively interact with the server computing element using a time-out message.

4. The system of claim 3, wherein the port test further comprises discovering a port status of the second port of the client computing element, the second port of the client computing element being associated with the application program operative on the client computing element.

5. The system of claim 4, wherein the first port is a uni-directional port of the client computing element and the second port is a bi-directional port of the client computing element.

6. The system of claim 5, wherein the client computing element generates a status report comprising the status of the first and second ports of the client computing element.

7. The system of claim 6, wherein the status report further comprises instructions to a user to configure the first port of the client computing element to enable the client computing element to communicatively couple to a remote client computing element when using the application program.

8. The system of claim 7, wherein the client computing element communicates with the server computing element through a router.

9. The system of claim 8, wherein the status report further comprises instructions to a user to configure the router.

10. The system of claim 9, wherein the client computing element communicates with the router to obtain operating information of the router.

11. The system of claim 7, wherein the application program is an audio-video chat program.

12. The system of claim 11, wherein the audio-video chat program is a video chat program.

13. The system of claim 12, wherein the client computing element further contains a database comprising a port information of a plurality of ports, for operating the application program.

14. The system of claim 13, wherein the port information comprises a plurality of port identifiers and a plurality of network transport protocols operative on the plurality of ports.

15. The system of claim 13, wherein the application program uses a transport control protocol (TCP) on the first port of the client computing element and a user datagram protocol (UDP) on a second port of the client computing element.

16. A system for port configuration, comprising:
    a processor;
    first communication port configured to send a first request message to a server computing element; and
    a memory, coupled to the processor, comprising:
        monitoring logic configured to monitor the first communication port for an acknowledgement message from the server computing component; and
        testing logic configured to, in response to an acknowledgement message being received, initiate a port test at the first communication port, the port test configured to facilitate interaction between the client computing element and the server computing element,
    wherein, during the port test, the server computing element communicatively interacts with the client computing element to discover a port status of the first communication port, the first communication port of the client computing element being associated with an application program operative on the client computing element, wherein in response to an acknowledgement message not being received, a determination is made whether a timeout timer has expired, and wherein in response to a determination that the timeout timer has expired, a second request message is sent to the server computing component, via a secondary communications port.

17. The system of claim 16, wherein the server computing element configured to receive a test initiation command that is transmitted by the client computing element using a first Internet Protocol socket.

18. A method for port configuration, comprising:
sending a first request message to a server computing element;
monitoring the first communication port for an acknowledgement message from the server computing component; and
initiating, in response to an acknowledgement message being received, a port test at the first communication port, the port test configured to facilitate interaction between the client computing element and the server computing element,
wherein, during the port test, the server computing element communicatively interacts with the client computing element to discover a port status of the first communication port, the first communication port of the client computing element being associated with an application program operative on the client computing element, wherein in response to an acknowledgement message not being received, a determination is made whether a timeout timer has expired, and wherein in response to a determination that the timeout timer has expired, a second request message is sent to the server computing component, via a secondary communications port.

19. The method of claim 18, wherein the server computing element configured to receive a test initiation command that is transmitted by the client computing element using a first Internet Protocol socket.

20. The method of claim 18, further comprising monitoring the secondary communications port to determine whether an acknowledgement is received.

* * * * *